Figure 1:
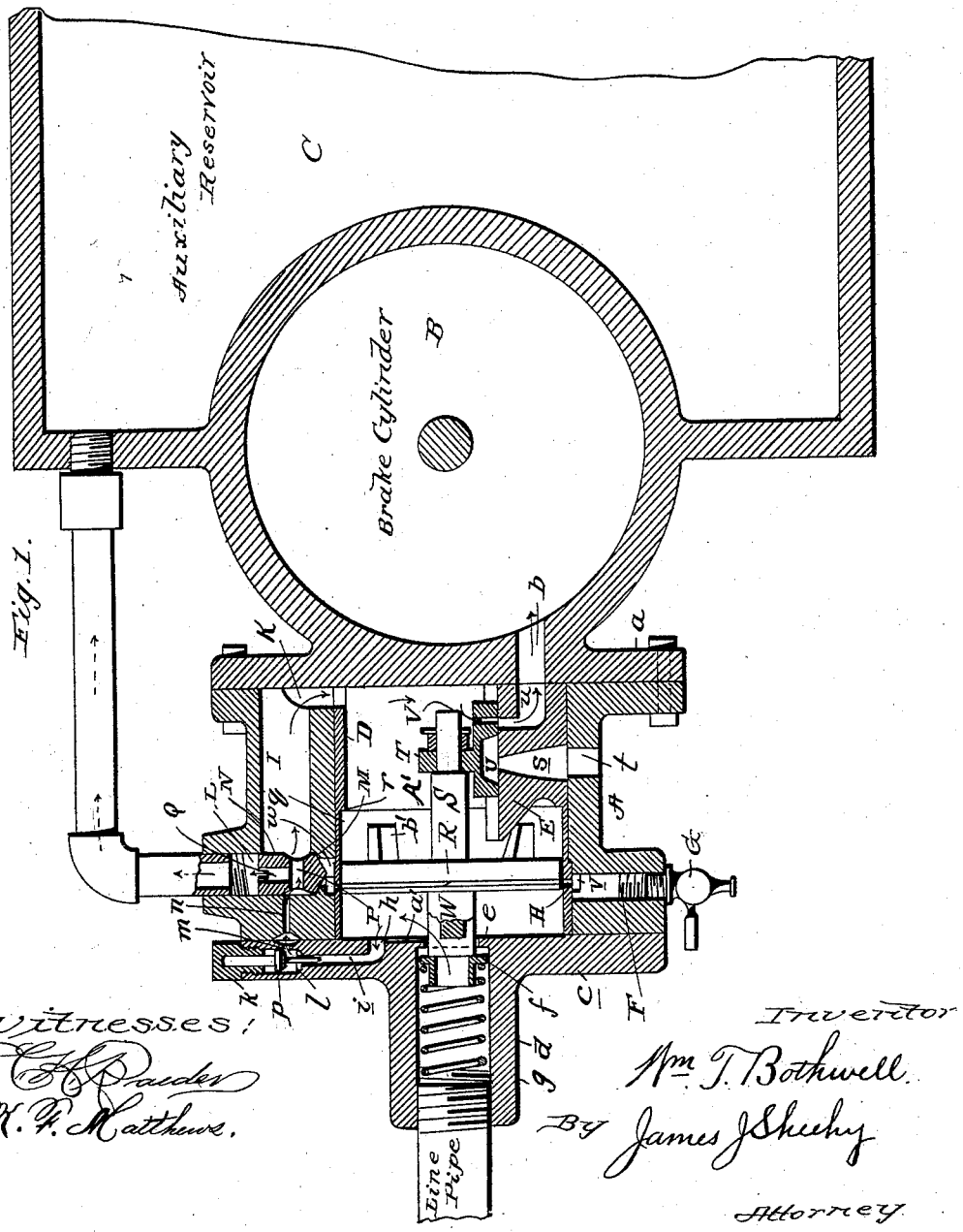

(No Model.) 2 Sheets—Sheet 1.

W. T. BOTHWELL.
FLUID PRESSURE BRAKE SYSTEM.

No. 580,843. Patented Apr. 20, 1897.

(No Model.) 2 Sheets—Sheet 2.

W. T. BOTHWELL.
FLUID PRESSURE BRAKE SYSTEM.

No. 580,843. Patented Apr. 20, 1897.

Witnesses:
Inventor
Wm. T. Bothwell
By James J. Sheehy
Attorney

UNITED STATES PATENT OFFICE.

WILLIAM T. BOTHWELL, OF JERSEY CITY, NEW JERSEY.

FLUID-PRESSURE BRAKE SYSTEM.

SPECIFICATION forming part of Letters Patent No. 580,843, dated April 20, 1897.

Application filed November 23, 1893. Renewed September 24, 1896. Serial No. 606,882. (No model.)

*To all whom it may concern:*

Be it known that I, WILLIAM T. BOTHWELL, a citizen of the United States, residing at Jersey City, in the county of Hudson and State of New Jersey, have invented certain new and useful Improvements in Fluid - Pressure Brake Systems; and I do declare the following to be a full, clear, and exact description of the invention, such as will enable others skilled in the art to which it appertains to make and use the same.

This invention has relation to improvements in fluid-pressure brake systems, and more particularly to the triple valves for regulating and controlling the supply and exhaust of fluid to and from the brake-cylinder. An important desideratum in this class of devices has been in a long train (say fifty cars) to bring into action the brakes of the last car or series of cars simultaneously with those of the car or cars adjacent to the locomotive and to apply and release the brakes of all the cars on the train simultaneously without an appreciable loss of air in the auxiliary or storage supply, without the use of pressure-retaining valves, and to use the full force of air in the auxiliary reservoirs in applying the brakes, so that any leakage which may occur in the brake-cylinder and couplings while the brakes are being applied and while the brakes are on will be replenished from the auxiliary reservoirs, and to store air in said reservoirs during every application of the brakes for a service stop and immediately after the application of the brakes for an emergency stop. To accomplish these several objects at a comparatively small expense is the prime object of my invention; and with such and other objects in view I have constructed an effective triple valve which will be highly sensitive to the changes of fluid-pressure in the train-pipe, so as to effectively control the passage of air to and from the brake-cylinder, control the passage of air or fluid between the brake-cylinder and the exhaust, control the passage of air between the train-pipe and the brake-cylinder in making a service stop and an emergency stop, control the passage of air so as to store it in the auxiliary reservoirs during an application of the brakes in making and during a service stop by the straight-air operation and store it in the auxiliary reservoirs immediately following an emergency stop, and, in fact, store air in the auxiliary reservoir on every application and release of the brakes and bring the full force of the auxiliary supply to bear in the brake-cylinders, so that there will be no perceptible loss of pressure due to leakage while the brakes are applied.

In the accompanying drawings I have shown one convenient embodiment of my invention, in which—

Figure 2:
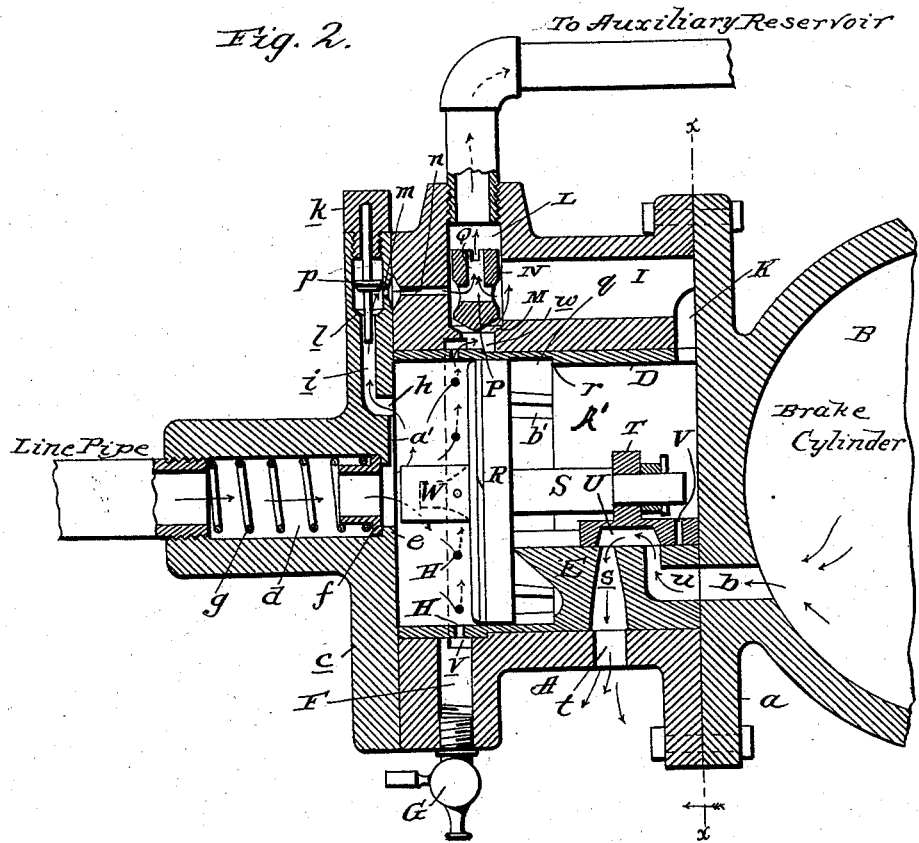
Figure 3:
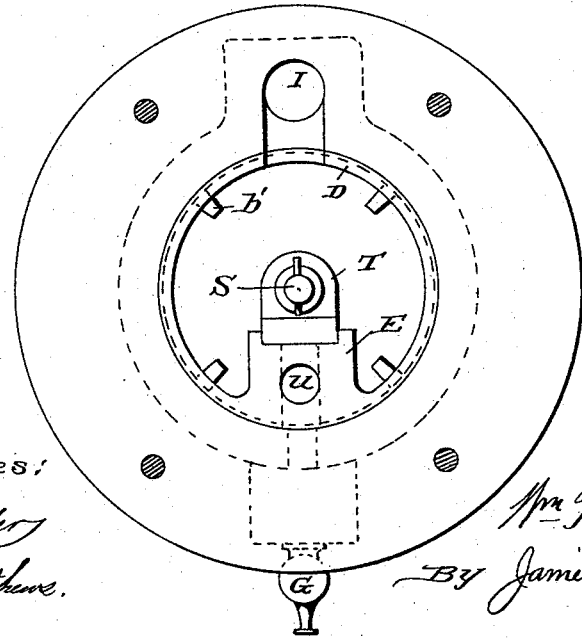

Figure 1 is a sectional view through the triple valve, the brake-cylinder, and auxiliary reservoir, with the latter partly broken away and illustrating the parts in a position as if making a service stop. Fig. 2 is a sectional view of the triple valve and a part of the brake-cylinder, illustrating the parts in a position as if the brakes were off; and Fig. 3 is a sectional view taken in the plane indicated by the dotted line *x x* of Fig. 2, looking in the direction of the arrow.

Referring by letter to said drawings, A indicates the triple-valve cylinder or casing, B the brake-cylinder, and C the auxiliary reservoir.

For the sake of compactness, cheapness, and durability I form one head of the auxiliary reservoir, one head of the triple-valve cylinder, and the body of the brake-cylinder entire, although it is obvious that these parts may be made separately and bolted or connected in the usual manner. The head *a* of the triple-valve cylinder, which is formed integral with the body of the brake-cylinder or may be secured thereto, as before described, has a port or passage *b*, which leads from the valve-chamber A' into the interior of the brake-cylinder, as shown. The opposite head *c* of the triple-valve cylinder is provided with a central port or passage *d* for connection with the train-pipe, and this port or passage leads into the valve-chamber A' on one side of the piston and has an internal annular shoulder or stop *e*, against which is seated an annulus *f*, which annulus furnishes a bearing for one end of the cushion or resistance spring *g*, the opposite end of which bears against the inner end of the train-pipe or other suitable stop. This head *c* is provided at a suitable point on its inner side with a hole or aperture *h*, which leads into a port or passage $i$, which is closed at its outer end by means of a nut or cap $k$ or the like, and in this port or passage is a valve-seat $l$, and passing laterally from said port above the valve-seat $l$ is an aperture $m$, which communicates with a port or passage $n$ in the body of the cylinder $a$ for a purpose which will be presently described. Arranged within the port or passage $i$ above the valve-seat is a check-valve $p$, which is designed to bear upon said seat when pressure in the train-pipe has been reduced, as will presently appear, and to rise from said seat and allow communication to be established between the ports or passages $i$ and $n$ when pressure has been increased in the train-pipe.

Within the valve-chamber $A'$ is arranged a lining D, which is preferably composed of brass and is turned down, as shown at $q$, so as to form a stop or shoulder $r$ for the backward movement of the piston-valve. This lining has formed in it a valve-seat E, and leading through this valve-seat is an exhaust port or passage $s$, communicating with a similar port or passage $t$ in the cylinder, and the seat is furthermore provided with a port or passage $u$, which communicates with the port or passage $b$, leading to the brake-cylinder. In the cylinder A, at a suitable distance from the forward end, is an annular groove $v$, which communicates with a port or passage $w$ and also communicates with a port or passage F, which latter is provided with a drip-cock G, and this annular groove is covered by the lining D, which has a circular series of holes H, connecting the interior of the cylinder with said annular groove.

I indicates a large passage in one of the side walls of the triple-valve cylinder, which communicates at one end with the valve-chamber $A'$ by a port or passage K and communicates at its opposite end with the opposite end of the valve-chamber through the medium of the passages $n$ and $i$, respectively, and, furthermore, communicates with the auxiliary reservoir by a port or passage L. At the base of the port or passage L is a valve-seat M, and arranged on this seat is a check-valve N. This check-valve has a transverse passage P and a vertical passage Q, communicating therewith, so that air or fluid pressure can at the same time move through both passages for a purpose which will presently appear.

R indicates the piston-valve. This piston-valve is arranged in the enlarged portion of the triple-valve cylinder, as shown, and is designed to cover and uncover the holes H in its forward and backward movements. Carried by the stem S of this piston-valve is a slide-valve T, which is connected thereto in the usual manner and has a recess U in its under side and a hole or aperture V vertically disposed therein. This valve T is arranged upon the seat E and is guided in its movements by suitable flanges, as shown. On the opposite end of the piston R is a projection W, which may be an extension of the piston-stem on that side, and this projection is designed to bear against the annulus $f$ when the piston has been driven forwardly where it will meet with the resistance of the spring $g$, and the inner side of the head $c$ is provided with a groove or channel $a'$, which is designed to establish a communication between the train-pipe and the port or passage $i$ when the piston R has been forced against said head, the projection W being kerfed, as shown, or otherwise adapted to permit the fluid-pressure to pass from the train-pipe port to the groove or channel $a'$.

The piston R is provided on one side with lugs $b'$ to engage the shoulder $r$ of the lining and form a stop for said piston in its backward movement.

In Fig. 1 of the drawings it will be seen that the parts are in a position with the brake applied for a gradual or service stop, and in this position of the parts air from the train-pipe has been admitted under such pressure to the forward side of the piston as to hold it covering the holes $h$ in the lining and passing up through the port or passage $i$ has lifted the small check-valve $p$ and thence passing through the port or passage $n$ is passed through the check-valve N to the auxiliary reservoir and to the opposite side of the piston in the valve-chamber, from which latter place it passes, as indicated by the arrows, through the small hole or aperture V in the slide-valve to the port or passage $u$ and from thence through the passage $b$ to the brake-cylinder, so on this application, by what is known as the "straight-air" operation, it will be seen that air is stored in the auxiliary reservoir while applying the brakes for a service stop and while the brakes are on. Now when it is desired to release the brakes it is simply necessary to increase the train-pipe pressure so as to uncover the holes H in the lining with the piston, as shown in Fig. 2 of the drawings, when the air will pass through the ports or passages $i$ and $n$ and through the check-valve N to the auxiliary reservoir, and air will also pass direct from the train-pipe through the valve-chamber and the holes H in the lining into the annular groove $v$ of the cylinder, and lifting the check-valve N from its seat M will also pass through the passages of the check-valve to the auxiliary reservoir, thus storing air in the auxiliary reservoir on the release of the brakes and while the brakes are released.

To make an emergency stop, air-pressure should be reduced in the train-pipe to such an extent as to allow the piston R to advance to the head $c$ or close thereto, when the check-valve N will be seated and the full force of the auxiliary-reservoir supply may be directed down through the check-valve N and through the passages I and K into the valve-chamber on the opposite or rear side of the piston R, and the slide-valve having passed clear of the port or passage $u$ the air will pass to the brake-cylinder and quickly apply the brakes. As quick as the air-pressure has been reduced in the train-pipe and the piston R brought up to the head c, so as to utilize the full force of the auxiliary pressure on the brake-cylinder, the train-pipe pressure being again gradually increased will pass through the groove or channel a' into the hole h, and from thence through the passage i will lift the check-valve p and pass through the port or passage n to the auxiliary reservoir while the brakes are applied.

While I have described specifically and in detail the exact construction which I have here shown, yet such is only one practical way of carrying out my invention, and I would have it understood that I reserve the right to alter and change such parts as may be found desirable by a good mechanic without departing from the spirit of the invention. I attach importance, however, to the fact that my device is simple in construction and may be manufactured at a small expense compared with the triple valves at present in use, there being no parts to get out of order.

Having described my invention, what I claim is—

1. A triple valve having a valve-chamber, train-pipe, auxiliary reservoir, exhaust and brake cylinder openings or ports communicating with the valve-chamber, a valve in said chamber adapted to control communication between the exhaust and brake cylinder openings or ports and between the valve-chamber and brake-cylinder opening or port, a piston to operate said valve, a check-valve, adapted to control communication between the auxiliary-reservoir port or opening and that part of the valve-chamber in front of the piston, a passage connecting the auxiliary-reservoir opening or port and the valve-chamber on the side of the piston with which the brake-cylinder port or opening communicates, an unobstructed passage connecting the auxiliary-reservoir port or opening and the valve-chamber on the side of the piston with which the train-pipe port or opening communicates, and a check-valve arranged in this latter passage and adapted to permit air to pass through the passage to the auxiliary-reservoir port or opening and prevent its return through the passage, substantially as and for the purpose set forth.

2. A triple valve having a valve-chamber, train-pipe, auxiliary reservoir, exhaust and brake cylinder openings or ports communicating with the valve-chamber, a valve in said chamber adapted to control communication between the exhaust and brake cylinder openings or ports and between the valve-chamber and brake-cylinder opening or port, a piston to operate said valve, a check-valve, adapted to control communication between the auxiliary-reservoir port or opening and that part of the valve-chamber in front of the piston, a passage connecting the auxiliary-reservoir opening or port and the valve-chamber on the side of the piston with which the brake-cylinder port or opening communicates, an unobstructed passage connecting the auxiliary-reservoir port or opening and the valve-chamber on the side of the piston with which the train-pipe port or opening communicates, a check-valve arranged in this latter passage and adapted to permit air to pass through the passage to the auxiliary-reservoir port or opening and prevent its return through the passage, and a passage a', adapted when the piston rests against the head of the triple valve to connect the passage in which the check-valve is arranged and the train-pipe port or opening, substantially as and for the purpose set forth.

In testimony whereof I affix my signature in presence of two witnesses.

WILLIAM T. BOTHWELL.

Witnesses:
J. W. BISSELL,
A. J. DURROND.